(12) United States Patent
Brostmeyer

(10) Patent No.: US 7,930,889 B1
(45) Date of Patent: Apr. 26, 2011

(54) GAS OR STEAM TURBINE WITH INLET AIR COOLING

(75) Inventor: Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 515 days.

(21) Appl. No.: 12/118,729

(22) Filed: May 11, 2008

(51) Int. Cl.
*F03G 7/04* (2006.01)
(52) U.S. Cl. ............................ 60/641.6; 60/641.7
(58) Field of Classification Search ............ 60/641.6, 60/641.7
See application file for complete search history.

(56) References Cited

U.S. PATENT DOCUMENTS

| | | | | |
|---|---|---|---|---|
| 5,142,870 A * | 9/1992 | Angle | ............................ | 60/668 |
| 5,582,691 A * | 12/1996 | Flynn et al. | ...................... | 203/11 |
| 2009/0260358 A1 * | 10/2009 | Rapp et al. | .................... | 60/641.7 |
| 2009/0293502 A1 * | 12/2009 | Vandor | ........................ | 62/45.1 |

* cited by examiner

*Primary Examiner* — Hoang M Nguyen
(74) *Attorney, Agent, or Firm* — John Ryznic

(57) ABSTRACT

A power plant with an industrial gas turbine engine or a steam turbine to drives an electric generator to generate electric power. The compressor of the IGT or the condenser of the steam turbine is connected to a heat exchanger to cool the compressor inlet air or the steam passing through the condenser. The heat exchanger is located in or near an open source of water that has naturally cold water at a certain depth, and cold water is pumped from the open source and through the heat exchanger to pre-cool the air. The pre-cooled air passing through the heat exchanger will cool the compressor inlet air or cool the steam in the condenser to increase the efficiency of the IGT or steam turbine.

8 Claims, 1 Drawing Sheet

GAS OR STEAM TURBINE WITH INLET AIR COOLING

FEDERAL RESEARCH STATEMENT

None.

CROSS-REFERENCE TO RELATED APPLICATIONS

None.

BACKGROUND OF THE INVENTION

1. Field of the Invention

The present invention relates generally to an industrial gas turbine engine, and more specifically to inlet air cooling of the compressor in the engine.

2. Description of the Related Art Including Information Disclosed Under 37 CFR 1.97 and 1.98

An industrial gas turbine engine is used in a power plant to generate electrical power. A nuclear power plant may use an industrial gas turbine engine to produce power during peak loads so that the nuclear reactors can operate without reducing power during low loads. Many variables affect the overall efficiency of a gas turbine engine. One of these variables is for the inlet air temperature of the engine. The lower the air temperature passing into the compressor of the engine, the higher will be the efficiency. With the rising price of the fuel used in the combustor, improving the engine efficiency is necessary to keep costs low.

One process for increasing the efficiency of a gas turbine engine is to cool the turbine inlet air prior to compressing it in the compressor. This pre-cooling causes the air to have a higher density and thereby creating a higher mass flow rate through the turbine. a higher mass flow rate through the turbine will produce more power in the turbine and therefore increase the overall efficiency of the engine.

Various processes have been proposed for pre-cooling the compressor inlet air in the gas turbine engine. one prior art reference, U.S. Pat. No. 6,470,686 B2 issued to Pierson on Oct. 29, 2002 and entitled SYSTEM FOR CHILLING INLET AIR FOR GAS TURBINES, discloses the use of an air chiller at the inlet to the compressor along with a process for chilling water that is pumped through the chiller to act as a heat exchanger for cooling the inlet air. The tank that stores the chilled water is located onsite and requires the input of energy to cool the water that is used in the chiller.

U.S. Pat. No. 5,390,505 issued to Smith et al on Feb. 21, 1995 entitled INDIRECT CONTACT CHILLER AIR-PRE-COOLER METHOD AND APPARATUS discloses a power plant with a gas turbine engine that produces electrical power, where the inlet air for the engine is cooled by using ice. In a diurnal system, a cooling mass, such as ice, is generated and stored during one cycle, which cooling mass is then available for reducing the temperature of a contacting coolant fluid. This cooling-mass-generating cycle in the exemplary generator illustration may occur during an off-peak demand period, such as the night time, which minimizes the cost of generating the cooling mass (ice) as the cost of electrical power is usually lower for commercial users during the off-peak hours. See column 17, lines 9-18. In the Smith et al invention, the ice is formed close to the power plant.

What is needed in the art of industrial gas turbines used for power production is a process for cooling the compressor inlet air that requires less energy to provide the cooling that the cited prior art references.

BRIEF SUMMARY OF THE INVENTION

It is an object of the present invention to improve the efficiency of an industrial gas turbine engine used for electric power production.

It is another object of the present invention to reduce the air inlet temperature of compressor of the IGT in order to improve the efficiency of the engine.

The present invention is an industrial gas turbine engine for a power plant that produces electric power, where the inlet air for the compressor is cooled by a heat exchanger in which the cooling fluid is cold water taken from a deep water source such as an adjacent ocean or sea. The cold water at the deep open source of water is pumped up to a heat exchanger located near the power plant to cool the ambient air that is then delivered to the compressor inlet. The cold water that passes through the heat exchanger is then discharged into the open water source. Because the energy required for cooling the inlet air is mostly used to pump the water from the deep location and through the heat exchanger, very little energy is used to supply cold water to the heat exchanger.

DETAILED DESCRIPTION OF THE INVENTION

Figure 1:
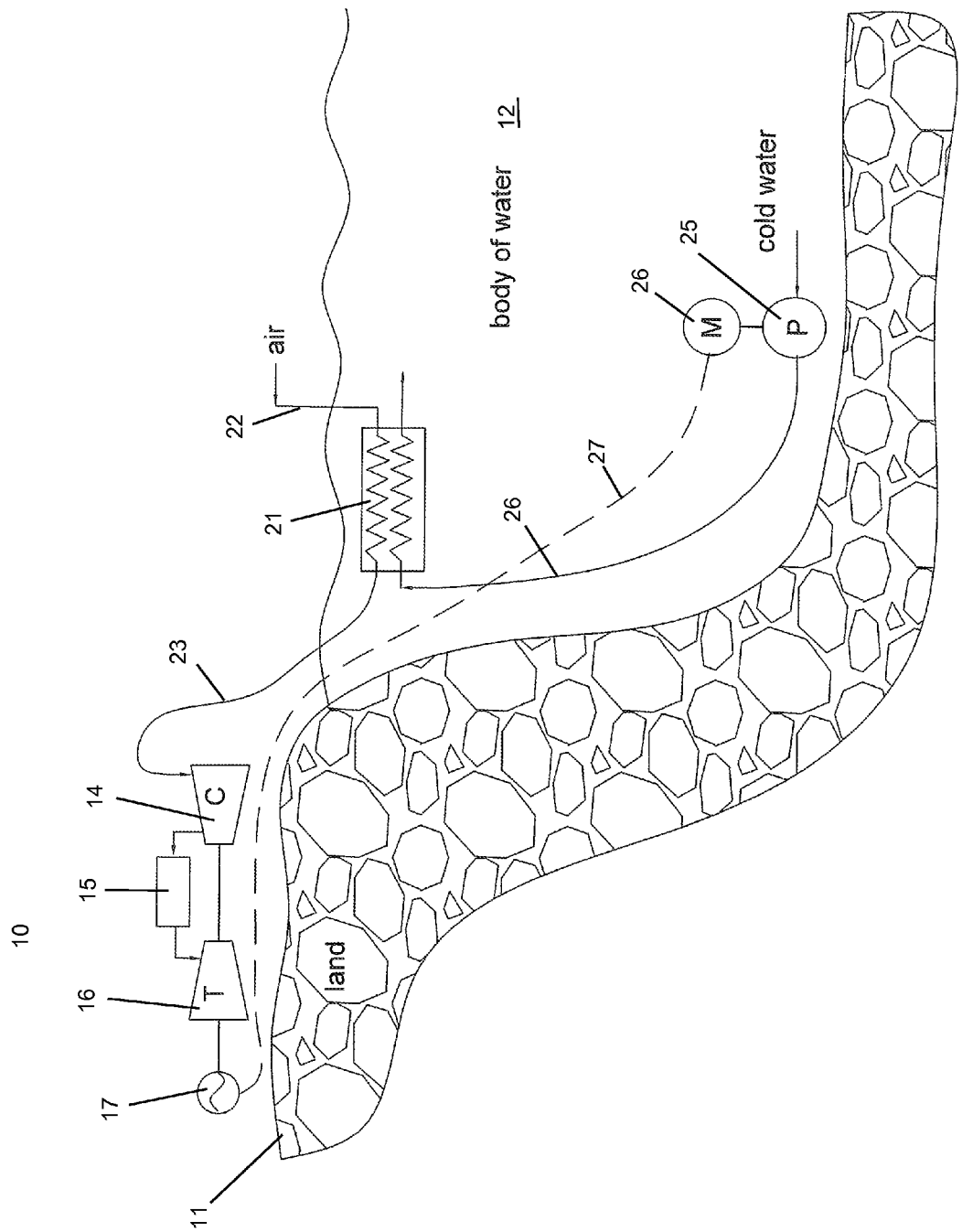
FIG. 1 shows a cross section view of the power plant of the present invention.

The present invention is a process for operating a gas turbine engine used in power production, specifically an industrial gas turbine engine in which the weight of the engine is not an issue. FIG. 1 shows a cross section of the power plant 10 of the present invention. A power plant 10 is located on land 11 near a deep water source 12 in which the water located near the bottom is cold water. The power plant 10 includes an industrial gas turbine engine with a compressor 14, a combustor 15 and a turbine 16 connected by a rotor shaft to the compressor 14. The turbine 16 drives an electric generator 17 to produce electricity.

The compressor 14 inlet is connected to a heat exchanger 21 that is located on land adjacent to the water source or in the water source near the surface and the power plant. The heat exchanger 21 includes an inlet pipe 22 connected to the outside air or ambient air and an outlet pipe 23 connected to the compressor 14 inlet. A pump 25 is located in the water source 12 at a location where the cold water is to be extracted. The pump 25 outlet is connected by a pipe 26 to the heat exchanger 21. An electric motor 26 is located near and drives the pump 25 in the water. An electrical cable 27 runs from the power plant 10 to the electric motor 26 to drive the pump 25 when the inlet air cooling process is operating.

The power plant operates as follows. The electric motor 26 drives the submerged pump 25 to pump cold water from the deep water source up through the pipe and through the heat exchanger 21. As this is happening, the compressor 14 draws air from the atmosphere and through the heat exchanger 21 so that the cold water cools the air. The cooled air then passes into the compressor 14 inlet to be compressed and burned with a fuel in the combustor 15 to generate the hot gas flow that is then passed through the turbine 16 to drive the rotor shaft and the electric generator 17. The cold water that is passed through the heat exchanger 21 is discharged into the open water source.

The heat exchanger 21 can be located in the water source 12 near the surface or can be located on the land between the water and the power plant 10. Also, several pumps 25 can be located along the pipe 26 that carries the cold water from the deep ocean water source to the heat exchanger 21 if needed. Also, a second compressor can be used to force the ambient air through the heat exchanger 21 and then into the compressor 14 inlet if needed. This second compressor could also be driven by an electric motor powered by electricity from the electric generator 17 of the power plant. The pipe 26 that carries the cold water from the deep water source can also include insulation to prevent heat transfer from the warmer water near the surface and into the colder water from the ocean bottom. The cold water pump 25 and electric motor 28 can be located on the bottom of the water source where the water temperature is cold enough to produce the desired cooling of the compressor inlet air.

Instead of pre-cooling the air for the compressor 14 in an industrial gas turbine engine, the cold water cooled heat exchanger 21 can also be used in a condenser of a steam turbine.

I claim the following:

1. A process for operating an industrial gas turbine engine or a steam turbine comprising the steps of:
   pumping cold water from an open water source where the water temperature is naturally kept at a desired cold temperature;
   passing the cold water with the desired temperature through a heat exchanger to cool an outside air;
   passing the cooled outside air from the heat exchanger into the inlet of the compressor of the industrial gas turbine engine or the condenser of the steam turbine; and,
   burning the cooled and compressed air in the gas turbine engine to produce electrical power, or cooling steam into water in a condenser of the steam turbine with the cooled and compressed air.

2. The process for operating an industrial gas turbine engine of claim 1, and further comprising the step of:
   discharging the cold water from the heat exchanger into the open water source.

3. The process for operating an industrial gas turbine engine of claim 1, and further comprising the step of:
   passing substantially all of the compressor or the condenser inlet air through the heat exchanger to be cooled by the cold water.

4. A power plant to produce electrical power comprising:
   an industrial gas turbine or a steam turbine rotatably connected to an electric generator to produce electrical power;
   a heat exchanger located near the power plant and near a body of water having a naturally occurring cold water source;
   a pump located in the naturally cold water source and driven by an electric motor, the pump having an inlet to supply the cold water into the pump and an outlet to discharge cold water from the pump;
   the heat exchanger being connected by a pipe to the pump outlet such that cold water discharged by the pump flows through the heat exchanger;
   the heat exchanger being connected to the ambient air and to the inlet of the compressor of the industrial gas turbine engine or the condenser of the steam turbine such that ambient air flows through the heat exchanger and then into the compressor inlet or through the condenser; whereby,
   the pump delivers cold water to the heat exchanger to cool the ambient air prior to passing into the compressor inlet or the condenser such that the compressor inlet air has a higher density due to the pre-cooling or the steam in the condenser is cooled down.

5. The power plant of claim 4, and further comprising:
   the heat exchanger is located in the open water source near the surface.

6. The power plant of claim 4, and further comprising:
   the heat exchanger is located on land near the open water source.

7. The power plant of claim 4, and further comprising:
   the pump is located at a depth in the open water source where the desired water temperature is found.

8. The power plant of claim 4, and further comprising:
   substantially all of the compressor inlet air or the condenser air is passed through the heat exchanger to be cooled by the cold water.

\* \* \* \* \*